(12) United States Patent
Miller et al.

(10) Patent No.: US 12,052,459 B2
(45) Date of Patent: *Jul. 30, 2024

(54) THERMOSTAT WITH INTERACTIVE FEATURES AND SYSTEM AND METHOD FOR USE OF SAME

(71) Applicant: Enseo, LLC, Plano, TX (US)

(72) Inventors: Thomas R. Miller, Plano, TX (US); Vanessa Ogle, Fairview, TX (US); William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/547,088

(22) Filed: Dec. 9, 2021

(65) Prior Publication Data

US 2022/0103889 A1 Mar. 31, 2022

Related U.S. Application Data

(63) Continuation-in-part of application No. 17/317,652, filed on May 11, 2021, now Pat. No. 11,297,376,
(Continued)

(51) Int. Cl.
*H04N 21/431* (2011.01)
*F24F 11/52* (2018.01)
(Continued)

(52) U.S. Cl.
CPC ........... *H04N 21/431* (2013.01); *F24F 11/52* (2018.01); *G05B 15/02* (2013.01);
(Continued)

(58) Field of Classification Search
CPC ..... F24F 11/52; G05B 15/02; G05D 23/1905; H04L 12/2816; H04N 21/4126;
(Continued)

(56) References Cited

U.S. PATENT DOCUMENTS 5,661,517 A 8/1997 Budow et al.
5,664,174 A 9/1997 Agrawal et al.
(Continued)

FOREIGN PATENT DOCUMENTS

CA 3058467 A1 * 10/2018 ......... G06K 9/00335
CA 3153935 A1 * 3/2021 ............ G05B 15/02
(Continued)

*Primary Examiner* — Crystal J Barnes-Bullock
(74) *Attorney, Agent, or Firm* — Scott Griggs; Griggs Bergen LLP

(57) ABSTRACT

A thermostat with interactive features and a system and a method for use of the same are disclosed. In one embodiment of the thermostat, the thermostat receives various types of thermostat data such as information about display-based interactions with the thermostat, information about a plurality of amenities on a residential property co-located with the thermostat, and information from a proximate wireless-enabled programmable device interacting with the thermostat. The thermostat may render a map view of the property based on obtained map data. The map view may include an interactive graphical representation of the residential property and be annotated with at least a portion of the thermostat data.

14 Claims, 9 Drawing Sheets

Related U.S. Application Data which is a continuation of application No. 16/933,604, filed on Jul. 20, 2020, now Pat. No. 11,006,170, which is a continuation of application No. 16/138,699, filed on Sep. 21, 2018, now Pat. No. 10,721,518.

(60) Provisional application No. 63/131,406, filed on Dec. 29, 2020, provisional application No. 62/561,963, filed on Sep. 22, 2017.

(51) Int. Cl.
*G05B 15/02* (2006.01)
*G05D 23/19* (2006.01)
*H04L 12/28* (2006.01)
*H04N 21/41* (2011.01)
*H04N 21/436* (2011.01)
*H04N 21/442* (2011.01)
*H04N 21/472* (2011.01)
*H04N 21/81* (2011.01)

(52) U.S. Cl.
CPC ..... *G05D 23/1905* (2013.01); *H04L 12/2816* (2013.01); *H04N 21/4126* (2013.01); *H04N 21/4131* (2013.01); *H04N 21/436* (2013.01); *H04N 21/44222* (2013.01); *H04N 21/44231* (2013.01); *H04N 21/4424* (2013.01); *H04N 21/472* (2013.01); *H04N 21/8146* (2013.01)

(58) Field of Classification Search
CPC ............. H04N 21/4131; H04N 21/431; H04N 21/436; H04N 21/44222; H04N 21/44231; H04N 21/4424; H04N 21/472; H04N 21/8146

See application file for complete search history.

(56) References Cited

U.S. PATENT DOCUMENTS

| | | | |
|---|---|---|---|
| 5,675,788 A | 10/1997 | Husick et al. | |
| 5,742,816 A | 4/1998 | Barr et al. | |
| 5,842,200 A | 11/1998 | Agrawal et al. | |
| 6,029,176 A | 2/2000 | Cannon | |
| 6,286,005 B1 | 9/2001 | Cannon | |
| 8,255,090 B2 * | 8/2012 | Frader-Thompson | G01D 4/002 709/224 |
| 9,088,828 B2 | 7/2015 | Ogle et al. | |
| 9,326,009 B2 | 4/2016 | Ogle et al. | |
| 9,332,304 B2 | 5/2016 | Ogle et al. | |
| 9,344,757 B2 | 5/2016 | Ogle et al. | |
| 9,357,254 B2 | 5/2016 | Ogle et al. | |
| 9,513,642 B2 * | 12/2016 | Rogers | F24F 11/47 |
| 9,560,388 B2 | 1/2017 | Ogle et al. | |
| 9,654,826 B2 | 5/2017 | Ogle et al. | |
| 9,654,827 B2 | 5/2017 | Ogle et al. | |
| 9,712,872 B2 | 7/2017 | Ogle et al. | |
| 9,800,932 B2 | 10/2017 | Ogle et al. | |
| 9,832,489 B2 | 11/2017 | Ogle et al. | |
| 9,832,490 B2 | 11/2017 | Ogle et al. | |
| 10,091,534 B2 | 10/2018 | Ogle et al. | |
| 10,104,402 B2 | 10/2018 | Ogle et al. | |
| 10,142,662 B2 | 11/2018 | Ogle et al. | |
| 10,462,881 B1 | 10/2019 | Hammet | |
| 10,581,862 B2 * | 3/2020 | Matsuoka | G06Q 30/0202 |
| 10,721,518 B2 * | 7/2020 | Fang | H04N 21/41265 |
| 11,006,170 B2 * | 5/2021 | Fang | H04N 21/44231 |
| 11,277,893 B2 * | 3/2022 | Sinha | H05B 45/12 |
| 2007/0287498 A1 | 12/2007 | Wang | |
| 2011/0099575 A1 | 4/2011 | Woo et al. | |
| 2013/0080542 A1 | 3/2013 | Peng | |
| 2013/0086245 A1 | 4/2013 | Lu | |
| 2013/0328909 A1 | 12/2013 | Pacheco et al. | |
| 2013/0346564 A1 | 12/2013 | Warrick | |
| 2015/0100167 A1 * | 4/2015 | Sloo | G08B 17/10 700/278 |
| 2015/0256355 A1 | 9/2015 | Pera | |
| 2017/0142449 A1 | 5/2017 | Ogle et al. | |
| 2017/0156076 A1 | 6/2017 | Eom | |
| 2018/0077459 A1 | 3/2018 | Ogle et al. | |
| 2018/0084285 A1 | 3/2018 | Ogle et al. | |
| 2018/0110093 A1 | 4/2018 | Deros | |
| 2018/0167228 A1 | 6/2018 | Elcock | |
| 2018/0167516 A1 | 6/2018 | Warrick | |
| 2018/0211666 A1 | 7/2018 | Kolavennu | |
| 2018/0220476 A1 | 8/2018 | Jung | |
| 2018/0249188 A1 | 8/2018 | Fang et al. | |
| 2018/0270510 A1 | 9/2018 | Fang et al. | |
| 2019/0037248 A1 | 1/2019 | Ogle et al. | |
| 2019/0045229 A1 | 2/2019 | Ogle et al. | |
| 2019/0058586 A1 | 2/2019 | Kumar | |
| 2019/0081811 A1 * | 3/2019 | Miller | H04L 12/2829 |
| 2019/0098340 A1 | 3/2019 | Ogle et al. | |
| 2019/0190992 A1 | 6/2019 | Warrick | |
| 2019/0273749 A1 | 9/2019 | Nishimoto | |
| 2019/0342112 A1 | 11/2019 | Li | |
| 2019/0342942 A1 | 11/2019 | Deros | |
| 2020/0037004 A1 | 1/2020 | Fang | |
| 2020/0128646 A1 * | 4/2020 | Sinha | H05B 1/028 |
| 2020/0137453 A1 | 4/2020 | Fang | |
| 2020/0213158 A1 | 7/2020 | Fang et al. | |
| 2020/0287726 A1 | 9/2020 | Garnier et al. | |

FOREIGN PATENT DOCUMENTS

| | | | | |
|---|---|---|---|---|
| CN | 105378809 A | * | 3/2016 | ............. G05B 15/02 |
| CN | 106288191 A | * | 1/2017 | ............. F24F 11/00 |

* cited by examiner

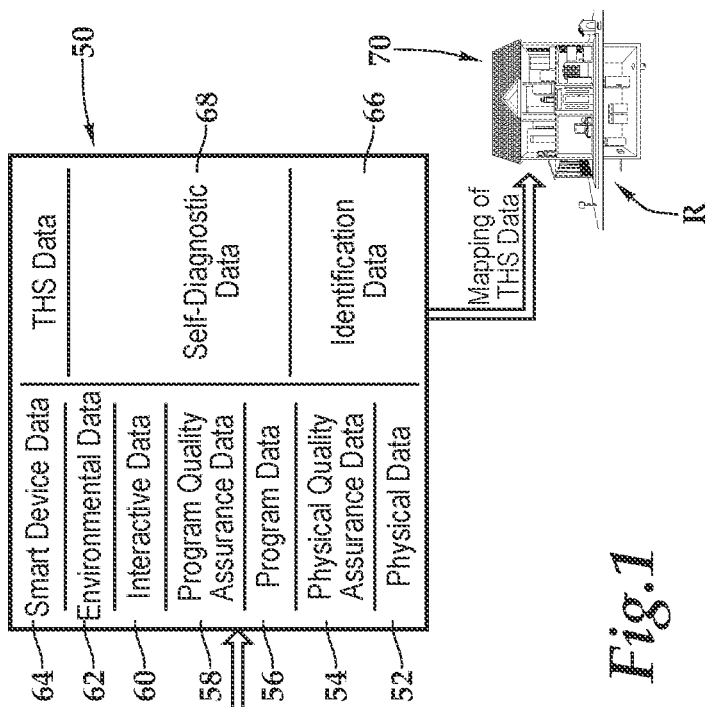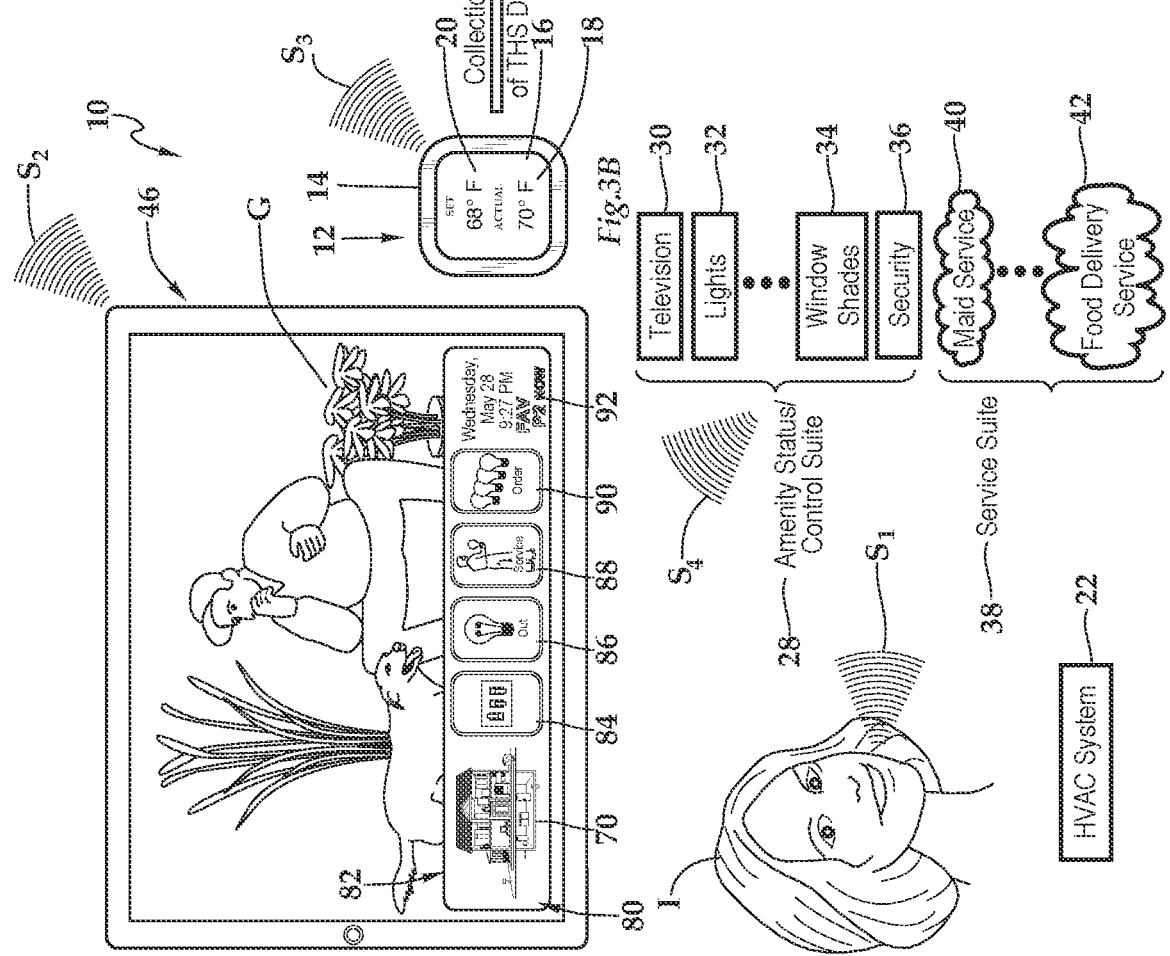
Fig.1

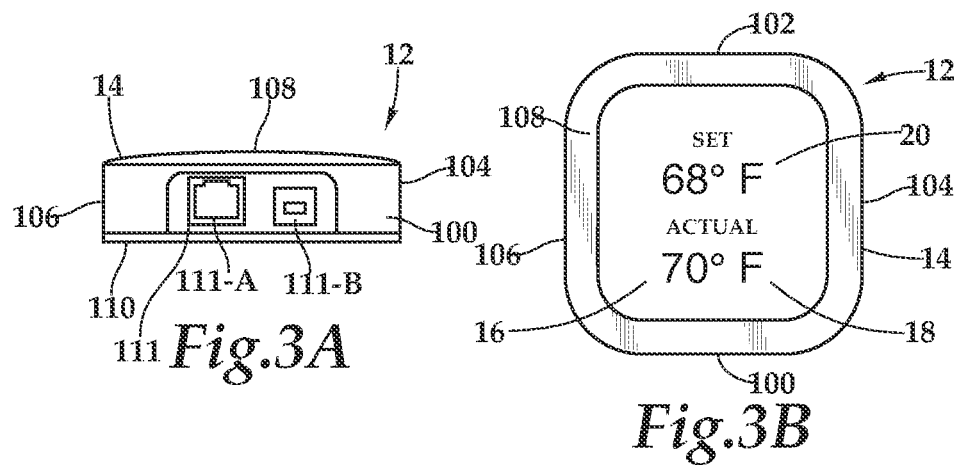
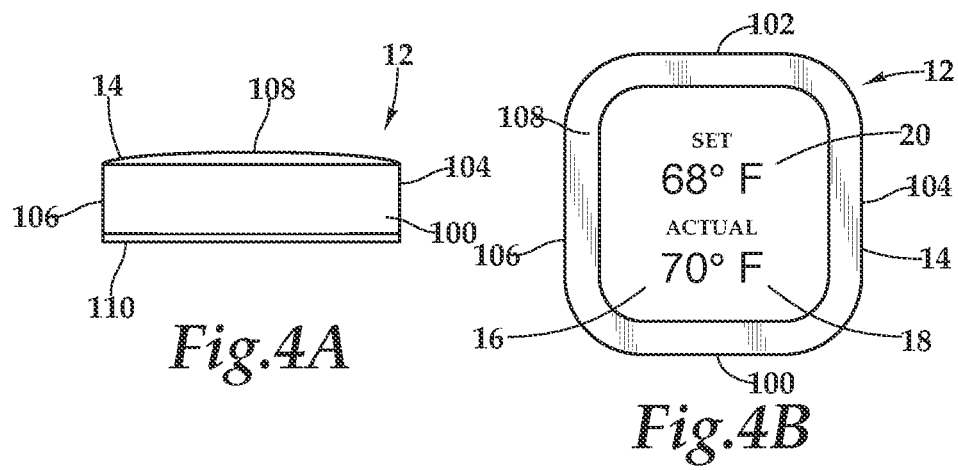
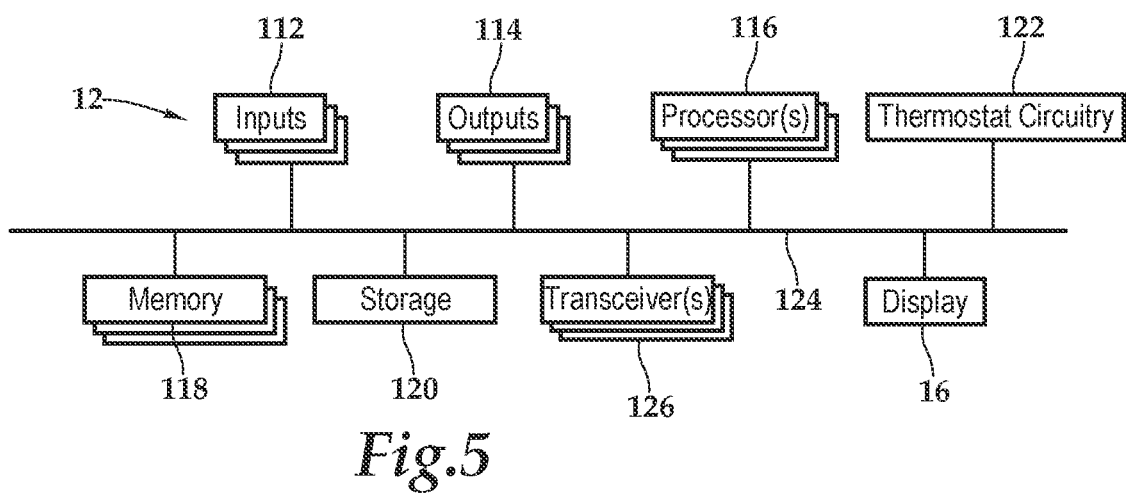
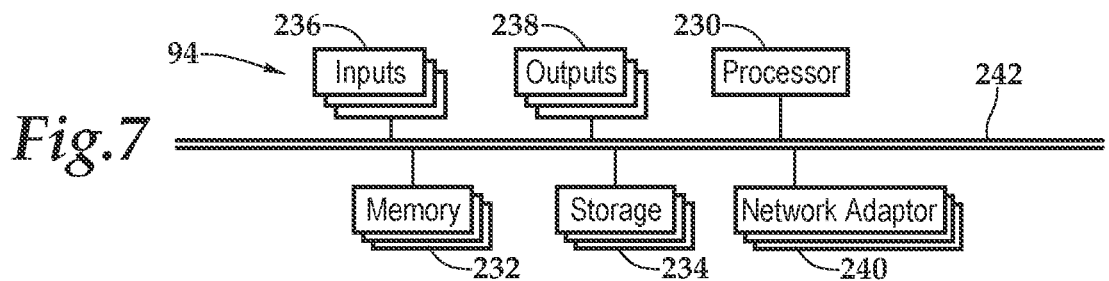

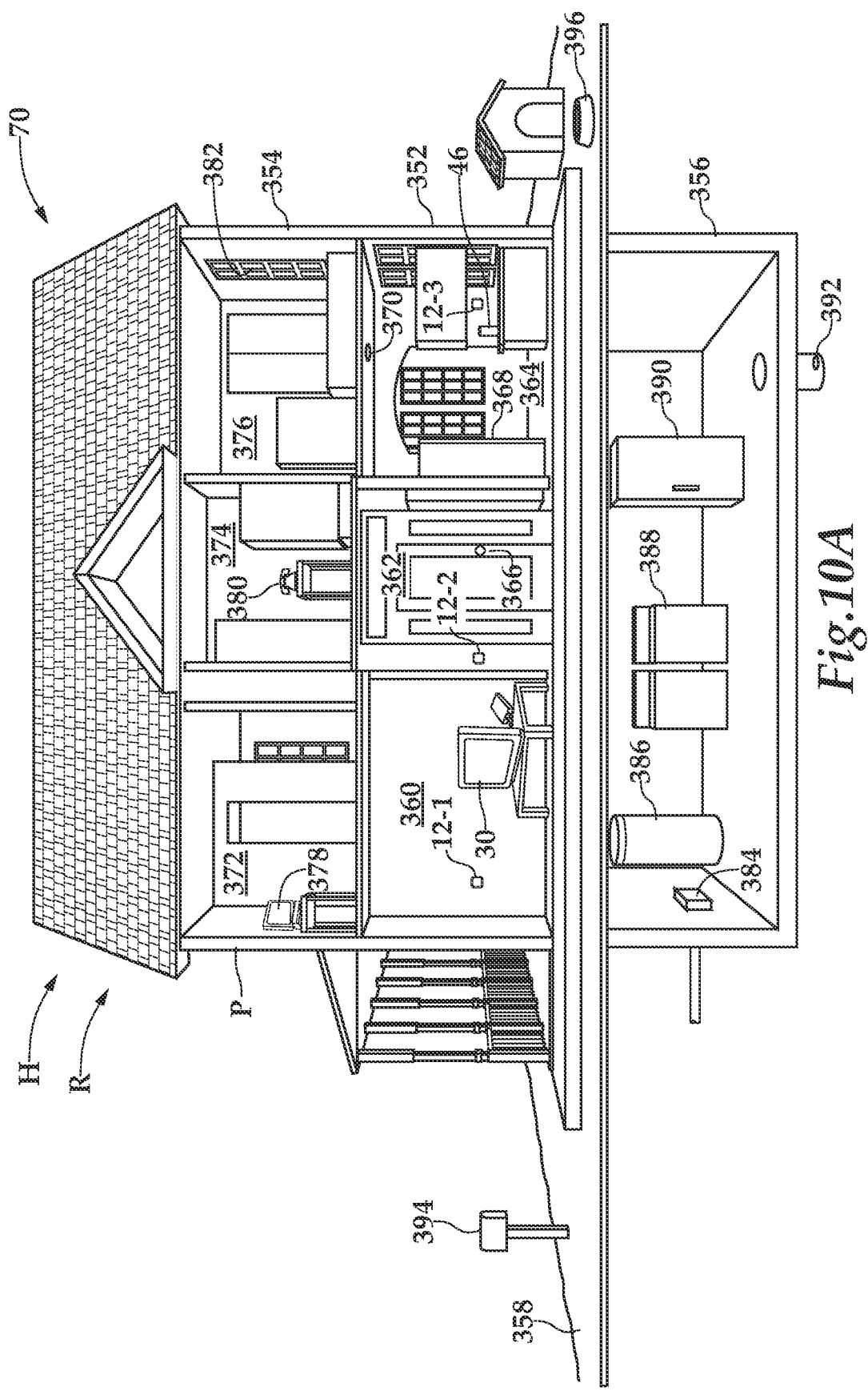

THERMOSTAT WITH INTERACTIVE FEATURES AND SYSTEM AND METHOD FOR USE OF SAME

PRIORITY STATEMENT & CROSS-REFERENCE TO RELATED APPLICATIONS

This application claims the benefit of U.S. Provisional Patent Application Ser. No. 63/131,406, entitled "Thermostat with Interactive Features and System and Method for Use of Same," filed Dec. 29, 2020, in the name of William C. Fang; which is hereby incorporated by reference, in entirety, for all purposes. This application is also a continuation in part of U.S. patent application Ser. No. 17/317,652, entitled "Set-Top Box with interactive Features and System and Method for Use of Same," filed on May 11, 2021, in the names of William C. Fang et al.; which is a continuation of U.S. patent application Ser. No. 16/933,604, entitled "Set-Top Box with Interactive Features and System and Method for Use of Same," filed on Jul. 20, 2020, in the names of William C. Fang, et al., now U.S. Pat. No. 11,006,170, issued on May 11, 2021; which is a continuation of U.S. patent application Ser. No. 16/138,699, entitled "Set-Top Box with Interactive Features and System and Method for Use of Same," filed on Sep. 21, 2018, in the names of William C. Fang et al., now U.S. Pat. No. 10,721,518, issued on Jul. 21, 2020; which claims benefit of U.S. Patent Application No. 62/561,963, entitled "Set-Top Box with Interactive Features and System and Method for Use of Same," filed on Sep. 22, 2017, in the names of Vanessa Ogle et al.; all of which are hereby incorporated by reference, in entirety, for all purposes.

This application discloses subject matter related to the subject matter disclosed in the following commonly owned, co-pending U.S. patent application Ser. No. 17/547,035 entitled "Thermostat with Interactive Features and System and Method for Use of Same" and filed on Dec. 9, 2021, in the names of Thomas R. Miller et al.; which is hereby incorporated by reference, in entirety, for all purposes.

TECHNICAL FIELD OF THE INVENTION

This invention relates, in general, to thermostats and, in particular, to thermostats with interactive features and systems and methods for use of the same that provide additional functionality to residences, as an example.

BACKGROUND OF THE INVENTION

Thermostats play a key role in making rooms comfortable and pleasant while occupants go about daily routines. As a result, thermostats are ubiquitous in homes. To enhance the experience, occupants are desiring thermostats with enhanced features and content in an easy-to-use platform. As a result of such consumer preferences, the quality of content and ease-of-use of thermostats are frequent differentiators in determining the experience. Accordingly, there is a need for improved systems and methods for providing thermostats with enhanced features in an easy-to-use platform for uses in residences and other locations.

SUMMARY OF THE INVENTION

It would be advantageous to achieve a thermostat that would improve upon existing limitations in functionality. It would also be desirable to enable a computer-based electronics and software solution that would provide a television or other display with enhanced features in an easy-to-use platform in a residential environment or in another environment. To better address one or more of these concerns, a thermostat with interactive features and system and method for use of the same are disclosed. In one embodiment of the thermostat, the thermostat receives various types of thermostat data such as information about display-based interactions with the thermostat, information about multiple amenities on a residential property co-located with the thermostat, and information from a proximate wireless-enabled programmable device interacting with the thermostat. The thermostat may render a map view of the property based on obtained map data. The map view may include an interactive graphical representation of the residential property and be annotated with at least a portion of the thermostat data. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a system for providing residential property management according to the teachings presented herein;

FIG. 3A is a front elevation view of one embodiment of the thermostat depicted in FIG. 1 in further detail;

FIG. 3B is a top plan view of the thermostat depicted in FIG. 3A;

FIG. 4A is a front elevation view of another embodiment of a thermostat, according to the teachings presented herein;

FIG. 4B is a top plan view of the thermostat depicted in FIG. 4A;

FIG. 5 is a functional block diagram depicting one embodiment of the thermostat presented in FIG. 1;

FIG. 7 is a functional block diagram depicting one embodiment of a server presented in FIGS. 2A and 2B;

FIG. 10A is a schematic diagram depicting one embodiment of a map representation of a residential property utilizing one embodiment of the system presented herein;

DETAILED DESCRIPTION OF THE INVENTION

Figure 2A:
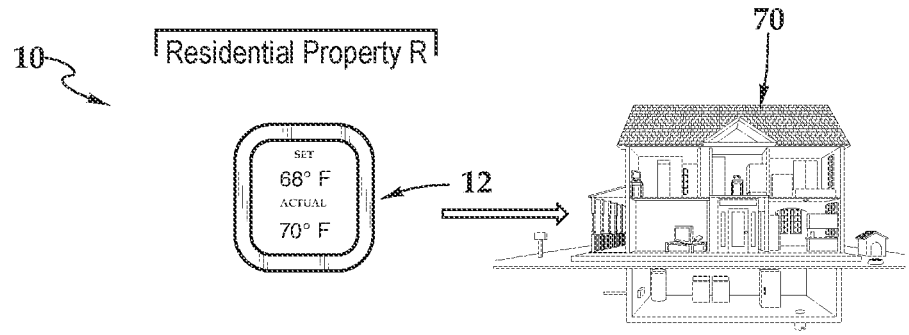
FIG. 2A is a schematic diagram depicting one embodiment of the system of FIG. 1 within an on-property deployment.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a system 10 utilizing a thermostat 12 with enhanced interactive features. The thermostat 12 may be utilized on a residential property R, which may be a single family residence, such as a house, duplex, townhome, or an apartment, for example. The thermostat 12 is located within the residential property R and is communicatively disposed with various amenities associated with the residential property R.

As illustrated, in one embodiment, within the residential property R, the system 10 includes the thermostat 12, which has a housing 14 having a display 16 showing an actual temperature 18 and a setpoint temperature 20. The thermostat 12 monitors and controls heating and cooling on the residential property R, or a portion thereof, to the setpoint temperature 20, which is adjustable, through communication between the thermostat 12 and an HVAC system 22.

An amenity status/control suite 28 represents the status and control of various amenities, such as residential amenities, associated with an individual I in the residential property R. The various amenities may include a television 30, lights 32, window shades 34, and security 36, for example. A service suite 38 represents a set of services associated with the individual I occupying, living, visiting, or staying, for example, in the residential property R. The various services may include maid service 40, pool service, and food delivery service 42, for example.

In one embodiment, the individual I may issue voice commands, such as signal $S_1$, from a distance to the thermostat in order to control the setpoint temperature 20, for example, or interact with the amenity status/control suite 28 or the service suite 38. The thermostat 12 is also communicatively disposed with a proximate wireless-enabled programmable device 46 is illustrated as a tablet computer having a touch screen display. Although a tablet computer is depicted, the proximate wireless-enabled programmable device 46 may be a personal computer, laptop, tablet computer, smart phone, smart speaker, smart television, or smart watch, for example. The proximate wireless-enabled programmable device 46 issues commands, such as signal $S_2$, from a distance to the thermostat 12 in order to control the setpoint temperature 20 via the thermostat 12, for example, or interact with the amenity status/control suite 28 or the service suite 38. In one implementation, an application installed from a server enables the thermostat 12 and the proximate wireless-enabled programmable device 46 to be wirelessly paired. In another embodiment, a challenge-response is utilized to wirelessly pair the thermostat 12 and the proximate wireless-enabled programmable device 46.

The thermostat 12 collects various thermostat data including physical data 52, physical quality assurance data 54, program data 56, program quality assurance data 58, interactive data 60, environmental data 62, and smart device data 64. Additionally, the thermostat data 50 includes identification data 66 identifying the thermostat 12 as well as self-diagnostic data 68. In one embodiment, the physical data 52 includes the actual hardware specifications and arrangement of cable connections at the time of installation. The physical quality assurance data 54 may be physical state data relating to a current condition of the hardware and the cable connections. The program data 56 may include information about a system software that engages the thermostat hardware and information about an application software that provides functionality relating to the individual's interest, for example. The program quality assurance data 58 may be software state data relating to the current operations of the system software and the application software. In one embodiment, the interactive data 60 includes information about display-based interactions of a guest with the thermostat 12. The environmental data 62 includes information about non-display-based interactions of a guest with the thermostat 12. In one implementation, the smart device data 64 may include information from the proximate wireless-enabled programmable device 46 interacting with the thermostat 12. In one implementation, the identification data 66 may include a location of the thermostat 12 as well as other information derived from the physical data 52 and the program data 56, which identifies the thermostat 12. The self-diagnostic data 68 relates to an application running automatically at a regular interval or continuously, for example, that detects faults—typically before becoming serious—in the physical data 52, the physical quality assurance data 54, the program data 56, the program quality assurance data 58, the interactive data 60, or the environmental data 62, for example.

By way of example, and not by way of limitation, the physical data 52 may be processor specifications, memory specifications, storage specifications, wireless specifications, firmware versions, connection to display by type, connection to display by model number, network addressing, MAC addresses, or the like. The physical quality assurance data 54 may be online/offline status, power state, display control status, display connection status, interface status, control interface status, memory usage, unit up-time, hardware installation progress, or the like. The program data 56 may be user interface software version, operating system version, settings version, welcome menu version, and software configuration, or the like. The program quality assurance data 58 may be program guide status, debug console log, software usage, and software installation progress, or the like. The interactive data 60 may be configuration data, program interaction data, or the like. The environmental data 62 may be amenity interaction, lighting status, thermostat status, window shades status, door status, or the like. The environmental data 62 may include information about cooling cycles, heating cycles, and setpoint temperature data, for example. The smart device data 64 may be geolocation data, smart apps configured to utilize the thermostat, smart app usage, or the like. The identification data 66 may be the serial number and addressing information gathered from the physical data, software identification information gathered from the program data 56 or the like. The self-diagnostic data 68 may be percent online, display output errors, self-test results, thermostat health reports, or the like.

As will be discussed in further detail hereinbelow, a map view 70 of the residential property R may be rendered by the system 10 as part of and following the collection of the thermostat data 50. More particularly, in one operational embodiment of the system 10, as discussed, the thermostat 12 stores the various thermostat data 50 and the thermostat 12 may render the map view 70 of the residential property R based on obtained map data, as will be discussed in more detail hereinbelow. The map view 70 may include a graphical representation of the spaces and rooms at the residential property R. The thermostat 12 may annotate the graphical representation of the room with at least a portion of the various thermostat data 50.

In one operational embodiment, in response to collecting thermostat data 50 from the thermostat, amenity status/control suite 28, service suite 38, and proximate wireless-enabled programmable device 46, the thermostat 12 has generated an interactive portal 80, which is provided by the thermostat 12 via signal $S_3$, which is wireless, to the proximate wireless-enabled programmable device 46. Alternatively, in another implementation, the Individual I may press a service button on a device, such as the proximate wireless-enabled programmable device 46, or navigate a menu to cause the generation of the interactive portal 80, which may be overlaid or superimposed on a program G on the display 16, in one embodiment, or partially or fully integrated therewith. The interactive portal 80 includes the map view 70 as well as interactive icons 82, and more particularly icons 84, 86, 88, and 90. Additionally, informational presentation 92 is provided, which includes date and time. It should be appreciated that any number or configuration of the interactive icons 82 may be presented, including an entire screen of the interactive icons 82 or a scrolling feature allowing a defined space to provide many sheets of the interactive icons 82. By way of example and not by way of limitation, the interactive icons 82 may include status icons, control icons, and service icons relating to the map 70, including lighting, security alarm systems, garage doors, front doors, hot-water heaters, sump pumps, door bells, pet bowls, HVAC systems, and entry points, for example. Further, it should be appreciated that the map view 70 may be displayed in some embodiments independently of the interactive portal 80.

In the embodiment shown, the icon 84 provides interaction with a lighting system to control the lights in the residential property R. The icon 86, a status icon initially generated from receipt of a signal $S_4$ at the thermostat 12, which provided the interactive data 60, indicates that a light bulb needs replacement in a kitchen, based on the map view 70. The icon 88 is a management icon providing for a service request, and actuation of the icon 88 by way of a voice command by the individual I, or the proximate wireless-enabled programmable device 46, for example, generates, by way of the thermostat 12, a maintenance request in substantially real time. The maintenance request may be sent to household member or other individual charged with lightbulb replacement. The icon 90, in this instance, indicates that the household is out of light bulbs and actuation of the icon 90, which executes a product fulfillment, orders the appropriate lightbulb from a third-party service.

As shown, the individual I views the interactive portal 80, including the map view 70 and the interactive icons 82. After viewing the map view 70, the individual I utilizes the proximate wireless-enabled programmable device 46 to send an interactive instruction in the form of a command to the thermostat 12 to actuate icon 88 to order maintenance of the lightbulb by, in one implementation, adding the lightbulb replacement to a "honey-do" list or causing the thermostat 12 to send a text message to an individual responsible for lightbulb replacement.

The interactive icons 82 may be words, graphical representations, or a combination of words and graphical representations, for example. In one implementation, the interactive icons 82 and the informational presentation 92 may be language independent. In this manner, the thermostat is providing various environmental support without the need for additional technology. Further, complex systems that require additional training are not needed as the systems and methods presented herein are intuitive.

Figure 2B:
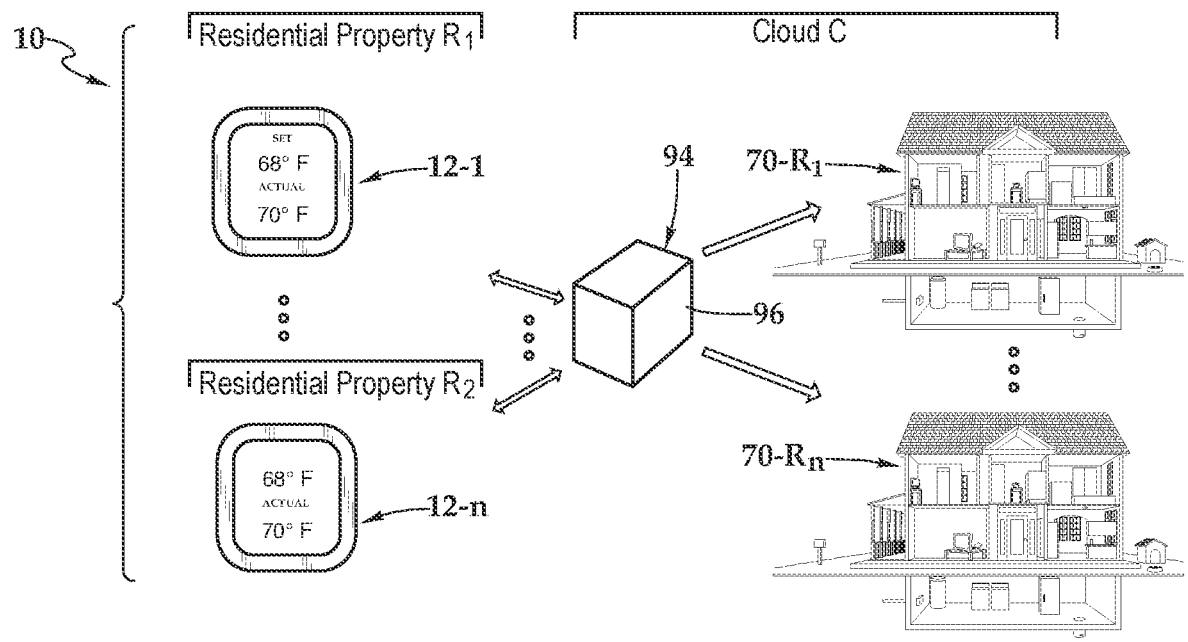
FIG. 2B is a schematic diagram depicting one embodiment of the system of FIG. 1 within a cloud-computing deployment.

Referring now to FIG. 2A, the system 10 may be deployed as discussed in FIG. 1 with the thermostat 12 collecting the thermostat data 50 and generating the map view 70 based on obtained map data with annotations based on the thermostat data 50 as discussed herein. Referring now to FIG. 2B, the system 10 may be deployed such that a server 94 is located remotely with respect to residential properties $R_1 \ldots R_n$, such as in a cloud-based deployment, shown by cloud C. As shown, each of the residential properties $R_1 \ldots R_n$ may respectively include thermostats 12-1 . . . 12-n. As shown, the remote server 94 includes a housing 96 having various components and software therein as will be discussed in FIG. 7, FIG. 8, and FIG. 9. In one embodiment, the thermostats 12-1 . . . 12-n send the thermostat data 50 periodically as part of regular broadcasts or in response to an inquiry made from the remote server 94. The remote server 94 receives the thermostat data 50 from the thermostats 12-1 . . . 12-2.

The remote server 94 or each of the thermostats 12-1 through 12-n in combination with the remote server 94 may render the map view 70 of the respective residential properties $R_1 \ldots R_n$ based on obtained map data with annotations based on the thermostat data 50 as discussed herein. In some embodiments, the map view 70 may include a graphical representation of one or more rooms of the residential properties $R_1 \ldots R_n$ that are annotated with thermostat data 50 relative to the physical data 52, the physical quality assurance data 54, the program data 56, the program quality assurance data 58, the interactive data 60, the environmental data 62, the smart device data 64, the identification data 66, and/or the self-diagnostic data 68. It should be appreciated that the remote server 94 may be remotely located to serve multiple properties having multiple televisions.

Referring to FIG. 3A and FIG. 3B, the thermostat 12 may be a wall-mounted unit that is an information appliance device that generally contains convenience and data functionality in addition to monitoring and controlling heating and cooling in a room or other environment to a setpoint temperature. The thermostat 12 includes the housing 14, which as discussed, has the display 16 showing the actual temperature 18 [70° F. (21° C.)] and the setpoint temperature 20 [68° F. (20° C.)]. The housing 14 also has a front wall 100, a rear wall 102, a side wall 104, a side wall 106, a top wall 108, and a bottom base 110. It should be appreciated that front wall, rear wall, and side wall are relative terms used for descriptive purposes and the orientation and the nomenclature of the walls may vary depending on application. The front wall 100 includes various ports 111, including ports 111-A, 111-B that provide for the exchange of information between components, including inputs 112 (please see FIG. 6) and outputs 114 (please see FIG. 6). In one implementation, as illustrated, the port 111-A is an RJ45 port and port 111-B is a USB2 port. It should be appreciated that the configuration of ports may vary with the thermostat depending on application and context. By way of further example, referring to FIG. 4A and FIG. 4B, the thermostat 12 may have no additional ports.

Referring now to FIG. 5, within the housing 14, the display 16, inputs 112, outputs 114, processor or processors 116, memory 118, storage 120, and thermostat circuitry 122 are interconnected by a bus architecture 124 within a mounting architecture. The processor 116 may process instructions for execution within a computing device, including instructions stored in the memory 118 or in the storage 120. The memory 118 stores information within the computing device. In one implementation, the memory 118 is a volatile memory unit or units. In another implementation, the memory 118 is a non-volatile memory unit or units. The storage 120 provides capacity that is capable of providing mass storage for the thermostat 12. The inputs 112 and the outputs 114 provide connections to and from the computing device, wherein the inputs 112 are signals or data received by the thermostat 12, and the outputs 114 are signals or data sent from the thermostat 12.

A transceiver or transceivers 126 is associated with the thermostat 12 and communicatively disposed with the bus architecture 124. As shown, the transceiver 126 may be internal, external, or a combination thereof to the housing 14. Further, the transceiver 126 may be a transmitter/receiver, receiver, or an antenna for example. Communication between various amenities in the room and the thermostat 12 may be enabled by a variety of wireless methodologies employed by the transceiver 126, including 802.11, 3G, 4G, Edge, WiFi, ZigBee, near field communications (NFC), Bluetooth low energy, and Bluetooth, for example. Also, infrared (IR) may be utilized. As previously discussed, the transceiver 126 is configured to be joined in network communication with an environmental amenity or amities that are co-located within the room of the respective thermostat 12. It should be appreciated however, that communication between various amenities in the room and the thermostat 12 may be enabled as well by a variety of wired technologies, such as, for example, the wired technologies presented in FIG. 3A and FIG. 3B.

The memory 118 and the storage 120 are accessible to the processor 116 and include processor-executable instructions that, when executed, cause the processor 116 to execute a series of operations. As will be discussed in further detail below, the processor-executable instructions, or a portion thereof, may be implemented on the thermostat 12, the remote server 94, or distributed between the thermostat 12 and remote server 94. In some embodiments, the processor-executable instructions cause the processor 116 to receive the interactive data 60, the environmental data 62, and the smart device data 64 via the transceiver 126. As previously discussed, the thermostat data 50 includes the interactive data 60, the environmental data 62, and the smart device data 64. The processor-executable instructions cause the processor 116 to store the thermostat data 50. Further, the processor-executable instructions may cause the processor 116 to receive and store physical data 52, physical quality assurance data 54, and program data 56. As previously discussed, the physical data 52, the physical quality assurance data 54, and the program data 56 are forms of thermostat data 50. The processor-executable instructions may cause the thermostat data 50 to be sent to the remote server 94.

The processor-executable instructions may also cause the processor 116 to render the map view 70 of the residential property R based on obtained map data. The map view 70 may include an interactive graphical representation of the residential property R, the amenities, and any proximate wireless-enabled programmable devices. The processor 116 is then caused to annotate the interactive graphical representation of the residential property R with at least a portion of the thermostat data 50. The processor-executable instructions cause the processor 116 to send the annotated interactive graphical representation of the residential property R to the display 16, and then receive via the transmitter an interactive instruction relative to the annotated interactive graphical representation of the residential property R.

In some embodiments, the processor-executable instructions cause the processor 116 to render the map view 70 of the residential property R based on obtained map data and the map view 70 may include a graphical representation of the residential property R. The processor-executable instructions, when executed, may cause the processor 116 to render a 3-D perspective view of the residential property R, a multi-floor view of the residential property R, a 2-D top plan view of at least a portion the residential property R, the map view 70 of a floor of the residential property R, or the map view 70 of a room of the residential property R, for example. The map view 70 may be a virtual model of at least a portion of the physical body of the residential property R, including a virtual model of the physical body of the residential property R.

In some embodiments, the processor-executable instructions cause the processor 116 to at least partially integrate or at least partially combine multiple portions of the thermostat data 50 into the graphical representation of the residential property R or room. The processor-executable instructions may also include instructions that cause the processor 116 to implement a map application configured to provide a user interface and obtain instructions, such as interactive instructions, from a user on the desired map view and annotations. Further, the processor-executable instructions may cause the map view 70 to be integrated into an interactive portal.

Figure 6:
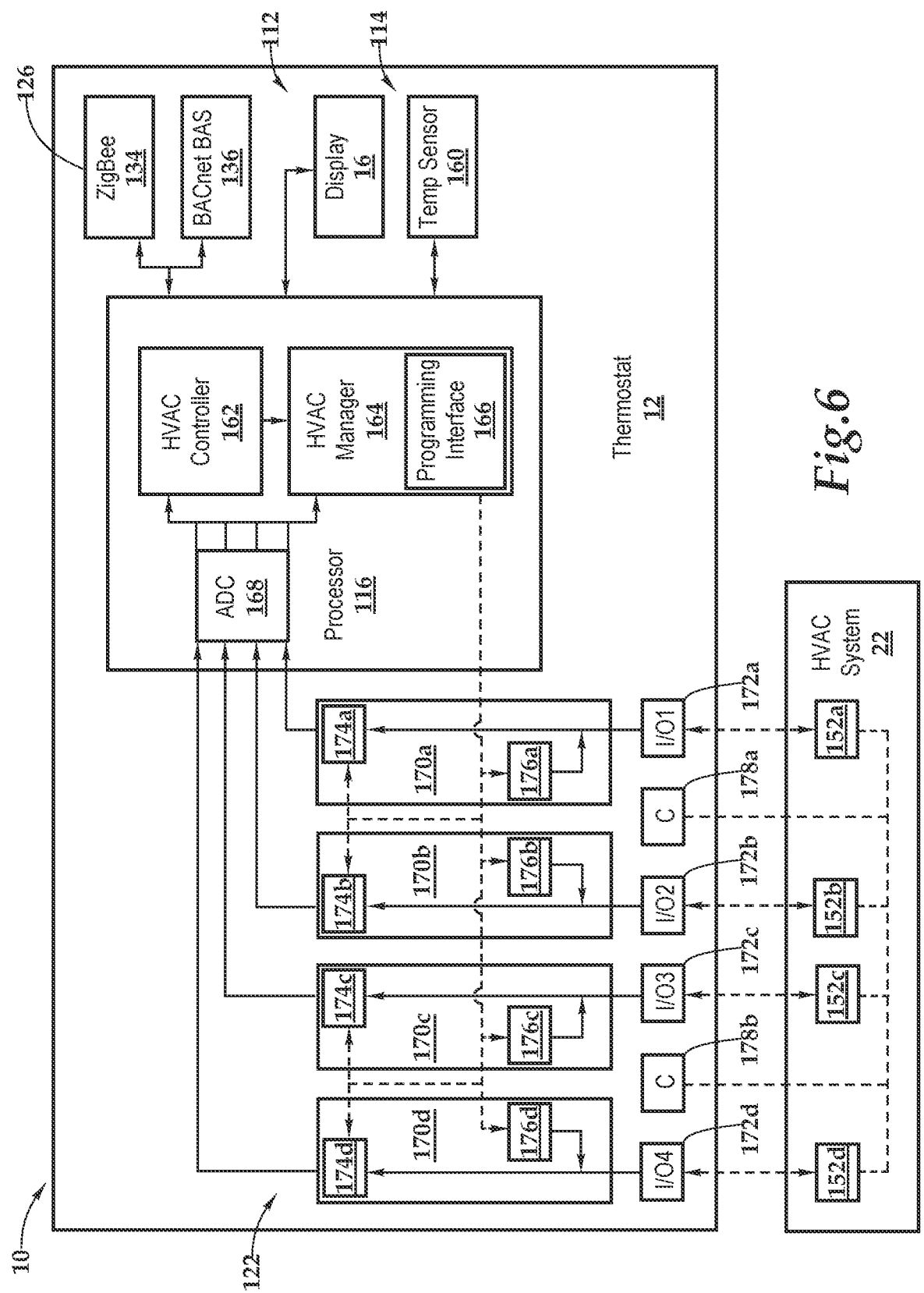
FIG. 6 is a functional block diagram depicting one operational embodiment of a portion of the thermostat shown in FIG. 5.

FIG. 6 depicts another operational embodiment of a portion of the thermostat 12 shown in FIG. 6. In this operational embodiment, the thermostat 12 is located in communication with the HVAC system 22, which may be servicing a space P (see FIG. 10A) and/or the residential property R, for example. The HVAC system 22 includes terminal connections 152a, 152b, 152c, and 152d providing an interface to various components of the HVAC system 22, including cooling, heating, humidity, and electronic air cleaning, for example. The terminal connections 152a, 152b, 152c, 152d are provided by way of nonlimiting example and it should be appreciated that the number and configuration of terminal connections may vary depending on the HVAC system 22 and application.

As shown, the thermostat circuitry 122 is interposed between the processor 116 and the HVAC system 22. The transceiver 126 communicates with the processor 116 and the transceiver 126 is depicted as a ZigBee antenna 134 in this embodiment. The inputs 112 and the outputs 114 to the thermostat 12 include a wired input/output device 136, the display 16, and a temperature sensor 160.

In the illustrated embodiment, the processor 116 includes an HVAC controller 162, an HVAC manager 164 having a programming interface 166, and an analog-to-digital (ADC) converter 168. The thermostat circuitry 122 includes interface circuits 170a, 170b, 170c, 170d coupled to terminal interfaces 172a, 172b, 172c, 172d. Each of the interface circuits 170a, 170b, 170c, 170d have an amplification circuit 174a, 174b, 174c, 174d and an input/output circuit 176a, 176b, 176c, 176d.

The processor 116 may execute machine-readable instructions stored in memory on behalf of the thermostat 12. By way of example, the processor 116 may include a microprocessor having one or more cores, microcontroller, application-specific integrated circuit (ASIC), digital signal processor, digital logic devices configured to execute as a state machine, analog circuits configured to execute as a state machine, or a combination of the above, for example. The processor 116 stores instructions that may include at least one of HVAC controller logic embodied in the HVAC controller 162 and configurable input and output manager logic embodied in HVAC manager 164. In one embodiment, the HVAC manager may include the programming interface 166, which is configured to communicate with the thermostat 12 and provide process-executable instructions thereto by way of non-transitory memory accessible to the processor 116.

The HVAC controller 162 is configured to receive and store user selectable configuration parameters for configuring, via the HVAC manager 164, the terminal connections 152a, 152b, 152c, 152d of the HVAC system 22 as part of the monitoring and controlling of heating and cooling in a room or other environment to the setpoint temperature 20. The HVAC controller 162 communicates the various configuration parameters and the setpoint temperature 20 to the HVAC manager 164, which may also receive configuration parameters from the programming interface 166.

In the illustrated embodiment, the HVAC manager 164 generates and outputs a group of configuration control signals for each of the input/output circuits 176a, 176b, 176c, 176d and each associated amplification circuit 174a, 174b, 174c, 174d of the interface circuits 170a, 170b, 170c, 170d based on the parameters to communicate with the HVAC system 22. Once the terminal interfaces 172a, 172b, 172c, 172d have been configured for a respective input or output interface signal type by the interface circuits 170a, 170b, 170c, 170d, the amplification circuits 174a, 174b, 174c, 174d may employ one or more of the configuration control signals to scale and normalize the feedback signals from the respective terminal interfaces 172a, 172b, 172c, 172d to the interface circuits 170a, 170b, 170c, 170d, which, in turn, drive signals to the ADC 168, which, as mentioned, forms a portion of the processor 116. The ADC 168 converts the feedback signal to a multi-bit digital signal that be provided to or stored in memory associated with the processor 116 for access by both the HVAC controller 162 and the HVAC manager 164 for further processing. As shown in the implementation presented in FIG. 6, the thermostat 12 may also include one or more common, neutral return or earth ground terminals 178a and 178b for connecting to a respective common, neutral return or earth ground connection of the HVAC system 22, for example.

As mentioned hereinabove, in one implementation, the thermostat 12 includes the transceiver 126, shown as the ZigBee antenna 134. The thermostat 12 may also include the wired input/output device 136 that may employ a standard network communication protocol, such as BACnet™ or other network protocol, for enabling signal communication to and from the thermostat 12. The thermostat 12 may further include the display 16 coupled to the processor 116 via a standard bus or other bi-directional parallel or serial communication protocol connection. The display 16 may be a standard touch screen or combination of a keyboard and display, or other input/output device. When executing instructions provided by a user or programming software or firmware contained in a setup or configuration application, for example, the processor 116 may generate and display a screen via the display 16 that includes a user selectable settings input to enable a user, whether the guest, resident, technician, or thermostat installer, to identify system parameters to the processor 116 pertaining to the HVAC system 22. The temperature sensor 160 provides input regarding the temperature at or near the thermostat 12 within the space P, for example. It should be appreciated that although a particular thermostat architecture is presented in FIG. 6, other architectures are within the teachings presented herein.

Referring now to FIG. 7, one embodiment of the remote server 94 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the remote server 94, including instructions stored in the memory 232 or in the storage 234. The memory 232 stores information within the computing device. In one implementation, the memory 232 is a volatile memory unit or units. In another implementation, the memory 232 is a non-volatile memory unit or units. The storage 234 includes capacity that is capable of providing mass storage for the remote server 94. The inputs 236 and the outputs 238 provide connections to and from the remote server 94, wherein the inputs 236 are signals or data received by the remote server 94, and the outputs 238 are signals or data sent from the remote server 94. The network adaptor 240 couples the remote server 94 to a network such that the remote server 94 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. As previously discussed, the processor-executable instructions, or a portion thereof, may be implemented on the thermostat 12, the remote server 94, or distributed between the thermostat 12 and remote server 94. In one embodiment, the processor-executable instructions cause the processor 230 to receive the thermostat data 50 from the thermostat 12 as well as receive the self-diagnostic data 68 from the thermostat 12. The processor-executable instructions may then cause the processor 230 to store the thermostat data from the thermostat in a database, which may be associated with the storage 234. The self-diagnostic data 68 from the thermostat 12 may also be caused to be stored in the database. The processor-executable instructions then cause the processor to render the map view 70 of the residential property R based on obtained map data. As previously discussed, the map view 70 may include the graphical representation of the room and the plurality of other rooms at the residential property R. The processor-executable instructions may then access the database and annotate the graphical representation of the room with at least a portion of the thermostat data 50.

In some embodiments, the processor-executable instructions cause the processor 230 to render the map view 70 of the residential property R based on obtained map data and the map view 70 may include a graphical representation of the residential property R. The processor-executable instructions, when executed, may cause the processor 230 to render a 3-D perspective view of the residential property R, a multi-floor view of the residential property R, a 2-D top plan view of at least a portion the residential property R, a map view 70 of a floor of the residential property R, or a map view 70 of a room of the residential property R, for example. The map view 70 may be a virtual model of at least a portion of the physical body of the residential property R, including a virtual model of the physical body of the residential property R.

In some embodiments, the processor-executable instructions cause the processor 230 to at least partially integrate or at least partially combine multiple portions of the thermostat data 50 into the graphical representation of the residential property R or a room within the residential property R. The processor-executable instructions may also include instructions that cause the processor 230 to implement a map application configured to provide a user interface and obtain instructions from a user on the desired map view 70 and annotations. Further, the processor-executable instructions may cause the map view 70 to be integrated into an interactive portal. The processor-executable instructions may cause the processor 230 to send the map view 70 to the thermostat 12.

Figure 8:
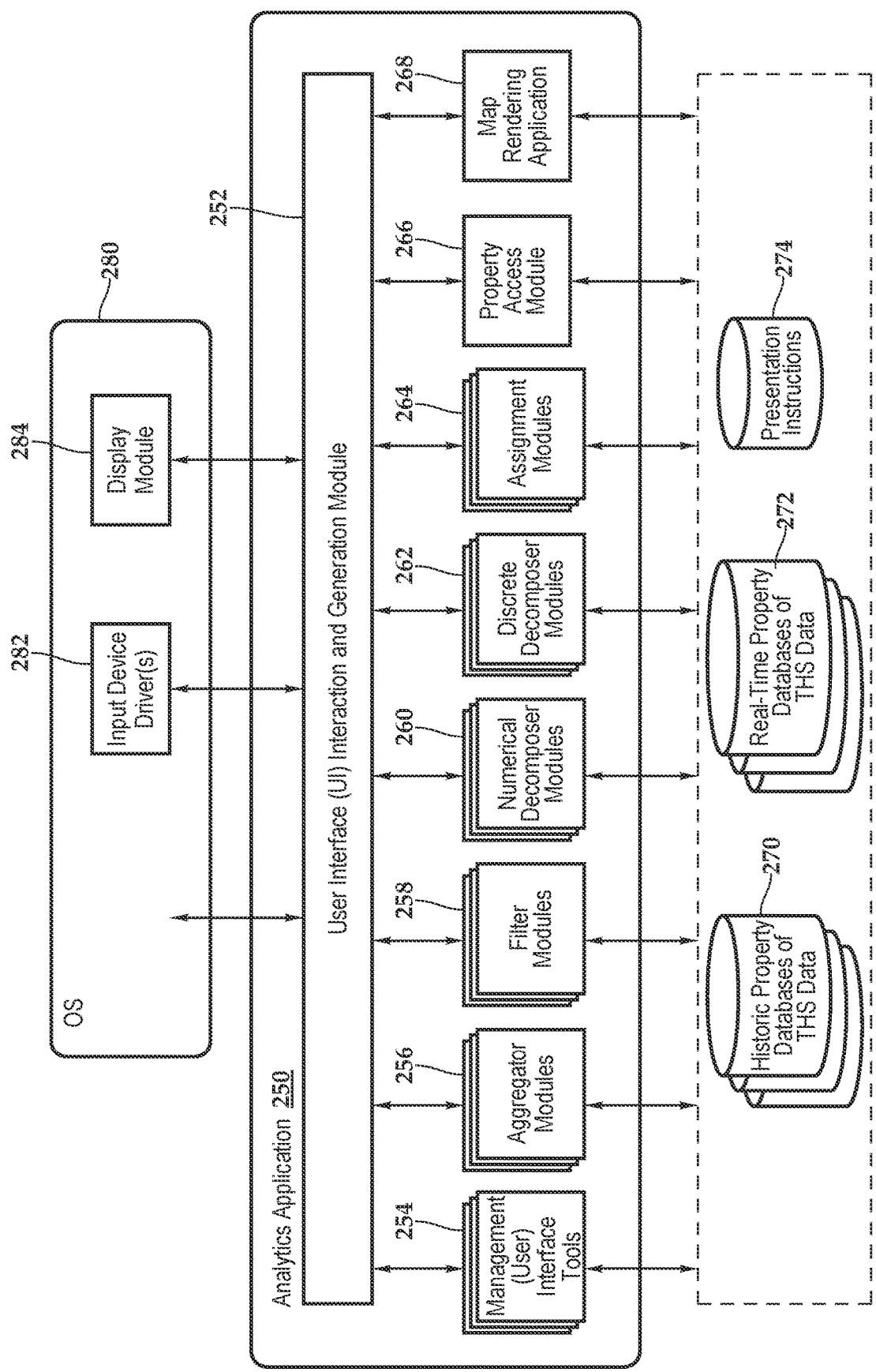
FIG. 8 is a conceptual module diagram depicting a software architecture of an analytics application of some embodiments.

FIG. 8 conceptually illustrates the software architecture of an analytics application 250 of some embodiments that may render the map view 70 of the residential property R. In some embodiments, the analytics application 250 is a stand-alone application or is integrated into another application, while in other embodiments the application 250 might be implemented within an operating system 280. In some embodiments, the analytics application 250 may be implemented within the thermostat 12. Furthermore, in some embodiments, the analytics application 250 is provided as part of a server-based solution or a cloud-based solution. In some such embodiments, the application is provided via a thin client, which may be installed on the thermostat 12. That is, the application runs on a server while a user interacts with the application via a separate machine remote from the server 94. In other such embodiments, the application is provided via a thick client, which may be installed on the thermostat 12. That is, the application is distributed from the server 94 to a client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, a property access module 266, and a map rendering application 268. The analytics application 250 has access to historic property databases of thermostat data 270, real-time property databases of thermostat data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows an end user to specify parameters that may be utilized to generate an annotated map view of the residential property R, which may include elements of a heat map. Prior to the generation of an annotated map view 70 of the residential property R, the aggregator modules 256 may be executed to obtain instances of the thermostat data 50. In other instances, the thermostat data 50 is continually provided to the analytics application 250 such that the aggregator modules 256 do not have to obtain instances of the thermostat data 50 proactively. The thermostat data 50 may also be filtered by the filter modules 258. The aggregator modules 256 and the filter modules 258 cooperate, in combination, to gather the desired thermostat data 50.

At this time, the parameters have been established for the annotated map view 70 of the residential property R by default or by the end user utilizing the management (user) interface tools 254. The numerical decomposer modules 260 may be executed to numerically decompose instances or summaries of the thermostat data 50 gathered by the aggregator modules 256 and the filter modules 258 by applying the selected performance characteristic or selected performance characteristics to the instances of the thermostat data 50. The discrete decomposer modules 262 may be executed to containerize the decomposed thermostat data 50. In this manner, multiple containers may be defined that each have a range of values. The assignment modules 264 may be executed to assign a pre-map annotation element to each of the multiple containers. The property access module 266 may be executed to obtain data from the historic property databases of thermostat data 270 or the real-time property databases of thermostat data 272. The map rendering application 268 may be executed to call a map rendering application 300 of FIG. 9, for example.

In the illustrated embodiment, FIG. 8 also includes the operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope, accelerometer, or speaker, for example. A user interacts with one or more of these input devices, which send signals to their corresponding device driver. The device driver then translates the signals into user input data that is provided to the UI interaction and generation module 252.

Figure 9:
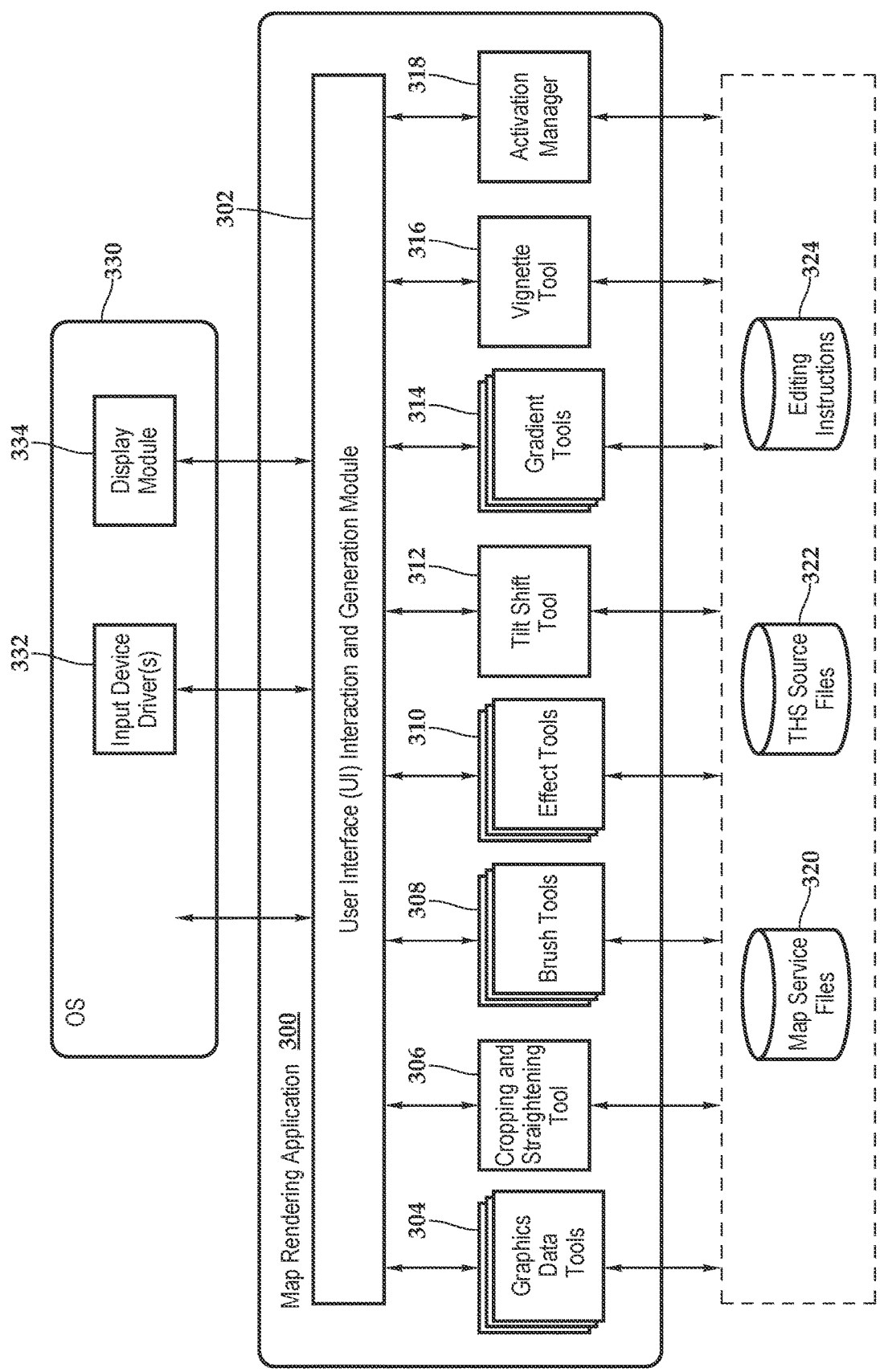
FIG. 9 is a conceptual module diagram depicting a software architecture of a map rendering application of some embodiments.

FIG. 9 conceptually illustrates the software architecture of the map rendering application 300 of some embodiments that may render the map view 70 of the residential property R. In some embodiments, the map rendering application 300 is a stand-alone application or is integrated into another application, while in other embodiments the application might be implemented within an operating system. In some embodiments, the map rendering application 300 may be implemented within the thermostat 12. Furthermore, in some embodiments, the map rendering application 300 is provided as part of a server-based solution or a cloud-based solution. In some such embodiments, the application is provided via a thin client, which may be installed on the thermostat. That is, the application runs on a server while a user interacts with the application via a separate machine remote from the server. In other such embodiments, the application is provided via a thick client, which may be installed on the thermostat. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to map service files 320, thermostat source files 322, and editing instructions 324. In some embodiments, the map service files 320 may be vector graphics data files with texture identifiers or two or three dimensional map image files specified in one or more map tiles that may be raster-based map tiles, for example. The map service files 320 create a virtual model of the physical body of the residential property R based on definitions derived from any GIS resources, such as a geodatabase, address location map document or geoprocess model, or any two- or three-dimensional CAD-based drawings and plans as well as architectural and building plans.

The thermostat source files 322 store operational instructions for processing the thermostat data 50. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and thermostat source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 9 also includes an operating system 330 that includes input device driver(s) 332 and a display module 334. In some embodiments, as illustrated, the device drivers 332 and display module 334 are part of the operating system 330 even when the image editing application is an application separate from the operating system 330. The input device drivers 332 may include drivers for translating signals from a keyboard, mouse, touchpad, tablet, touch screen, gyroscope, accelerometer, or speaker, etc. A user interacts with one or more of these input devices, which send signals to their corresponding device driver. The device driver then translates the signals into user input data that is provided to the UI interaction and generation module 302.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for the map view 70 of the residential property R with the appropriate annotations of the thermostat data 50.

Figure 10B:
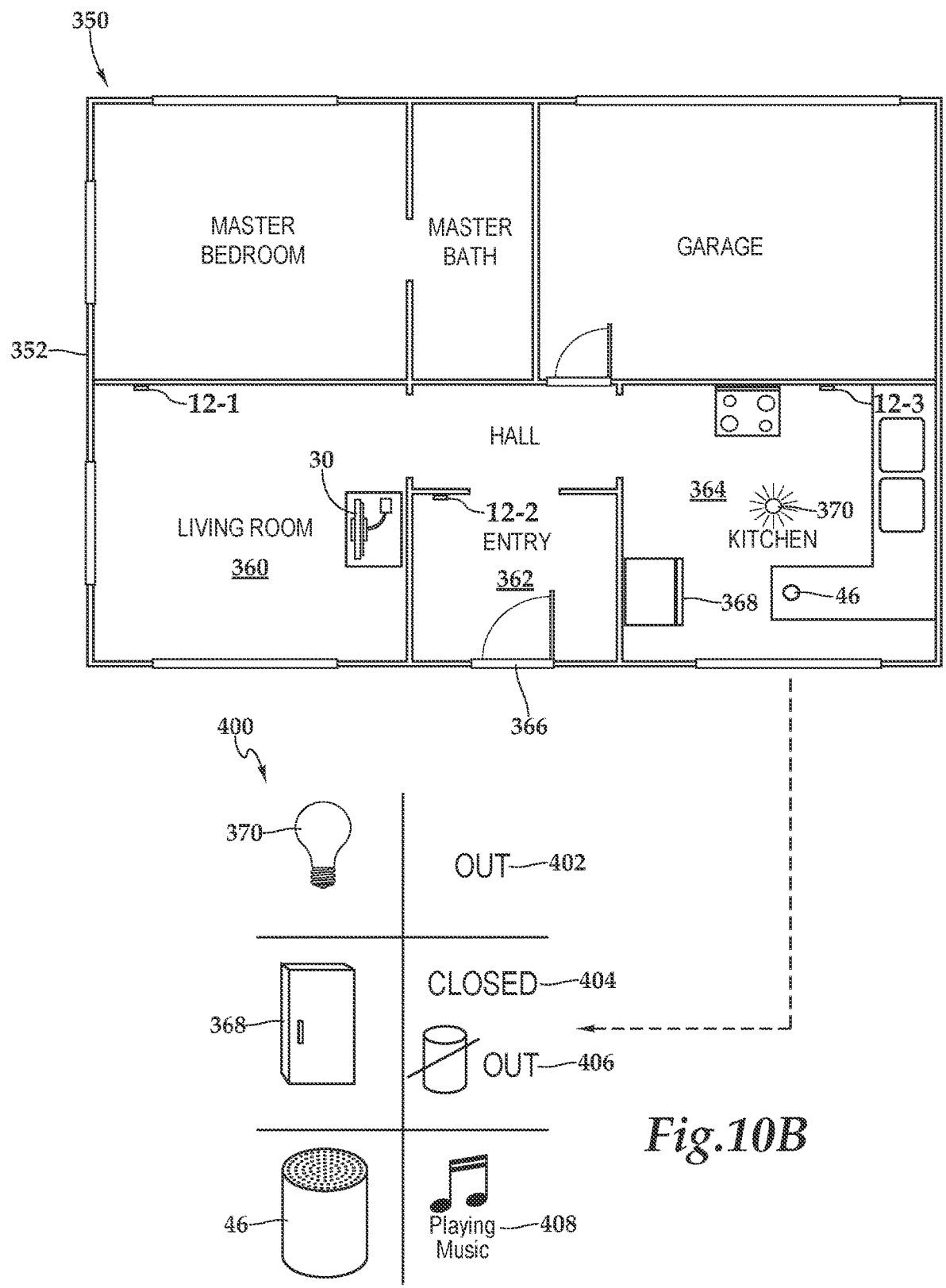
FIG. 10B is a schematic diagram depicting one embodiment of a map representation of a floor of the residential property presented in FIG. 10A.

Referring now to FIG. 10A and FIG. 10B, in one implementation, residential property monitoring and optimization is provided in the form of a database, or as shown, in the map view 70 of the residential property R including a graphical presentation 350 of a floor of the residential property R having spaces P, wherein particular rooms with the thermostat data 50 historically and in substantially real time permits a user or manager to select the desired information and make optimal property management decisions. In particular, color-coding and hue assignment adds additional understanding and visibility into housekeeping and maintenance conditions as well as use. As shown, the residential property R which is depicted as a home H, includes a first floor 352, a second floor 354, a basement 356, and a yard 358. A living room 360, an entryway 362, and a kitchen 364 are located on the first floor 352 and, by way of example, not by way of limitation, the thermostats 12-1, 12-2, 12-3 are positioned therein.

Sensors are associated with various household amenities throughout the first floor 352, second floor 354, basement 356, and yard 358 of the home H. The sensors may also be partially or fully integrated into the amenities. In one embodiment, each sensor or amenity is operable to transmit a wireless signal in response to an event occurrence associated with the respective household amenity, for example. As will be discussed further below, the event may be the ringing of a doorbell, the detection of water, or the detection of a low battery, for example. Further, in one embodiment, each sensor is operable to transmit a wireless signal in response to a status request or periodically. The thermostat 12-1 receives the wireless signals from the sensors and generates the aforementioned interactive portal 80. Such messaging provides a television viewer with the ability to monitor the status of home H and determine home awareness while engaged in watching television programming.

By way of example, the entryway 362 includes a front door 366 having a doorbell associated therewith. A sensor connected to the doorbell senses when the doorbell is rung and sends a corresponding wireless signal to the thermostat 12-1, which may incorporate an icon representative of "DOORBELL" into the interactive portal 80. The television viewer or viewers see the icon and are aware of the ringing doorbell while watching the television 30 in the living room 360. This is particularly useful in instances where the television viewers have the television volume excessively high or the doorbell amplifier and speaker is sufficiently removed from the living room 360.

By way of further example, the kitchen 364 includes a number of household amenities such as a refrigerator 368 that is equipped with a sensor that detects the status of the refrigerator door, i.e., open or closed. When the refrigerator door is open for more than 30 seconds, for example, a wireless signal is transmitted from the sensor to the thermostat 12. The thermostat 12-1 may include an icon in the interactive portal meaning "REFRIGERATOR DOOR AJAR". A light 370 is another household amenity that is located in the kitchen 364. A sensor associated with the light 370 monitors the illumination sends an appropriate wireless signal to the thermostat 12-1. The proximate wireless enabled programmable device 46, which shown as a smart speaker, is located on a counter top in the kitchen 364 to communicate with the thermostat 12 as previously discussed.

The second floor 354 of the home H includes a study 372, a hallway 374, and a bedroom 376. As illustrated, a computer 378 is located in the study 372. A sensor associated with the computer 378 sends a wireless signal to the thermostat 12 in response to receiving an email. A telephone 380 is sitting on a stand in hallway 374. A sensor associated with the telephone 380 monitors for an incoming call and broadcasts a wireless signal in response thereto. The bedroom 376 includes an entry point or window 382 having a sensor associated with a security system. The sensor broadcasts a wireless signal in response to the detection of broken glass or the opening of the window 382, for example.

Similarly, the basement 356 includes a number of household amenities having sensors associated therewith that send wireless signals to the thermostat 12-1. A water shut-off box 384, a hot water heater 386, a washer and dryer 388, a freezer 390, and a sump pump 392 each have a sensor that detects the occurrence of an event. The sensor associated with the water shut-off box 384 may detect the condition of the water valve; namely open or closed. The sensor associated with the washer and dryer 388 alerts the television viewer when a load has finished washing or drying. The sensor associated with the freezer 390 detects an ajar door and the sensor associated with the sump pump 392 broadcasts a wireless signal upon detecting the presence of water.

The amenities found in yard 358 may also include sensors. A mailbox 394 may include a sensor that detects the opening and closing of the mailbox door in order to provide an indication that mail has arrived. Additionally, a pet bowl 396 may include a sensor that detects emptying of food in the pet bowl 396. The household amenities described herein encompass simple mailboxes to complex security systems. Accordingly, it should be appreciated that the home H utilizing the systems presented herein permits members of the household to monitor any technology that the household is inclined to implement. In particular, the sensors may monitor household amenities relating to the environment, family comfort, utilities, appliances, and security. By way of further example, the sensors may monitor the turning ON or OFF of particular lights, power usage, the opening and closing of a garage door, the turning ON and OFF of an iron, the freezing of a pipe, the presence water leaks, the presence of gas or carbon monoxide (CO), temperature and humidity, the efficiency of an HVAC system, and the presence of smoke or fire. Additionally, the system for home awareness may provide schedule reminders, medical alerts, and the like.

It should be understood that although three thermostats 12-1, 12-2, 12-3, are illustrated in FIGS. 10A and 10B, the systems and methods presented herein may be utilized in one or multiple thermostat environments. Further, in one implementation, the computer 378 located in the study 372 is communicating with the thermostat 12-1 so that a user of the computer 378 is provided with home awareness.

In FIGS. 10A and 10B, by collecting the substantially real time and historic thermostat data from the residential property R, a map may be shown depicting data and information 400, for example. In particular, the kitchen 364 is highlighted to inspect the data status, which may include the physical data 52, the physical quality assurance data 54, the program data 56, the program quality assurance data 58, the interactive data 60, the environmental data 62, the smart device data 64, the identification data 66, the self-diagnostic data 68, or any subset or combination thereof. With this information and knowledge of the issue, individuals at the residential property R may appropriately administer the strategy for organizing and coordinating the resources of the property. As mentioned, it should be appreciated that other types of databases and charts may be prepared from the substantially real-time information collected.

As shown, the graphical representation 350 of the kitchen 364 is annotated with the data and information 400. For example, the data and information 400 shows the status indicator 402 of the kitchen light 370 as OUT and needing replacement, the refrigerator 368 has a closed door and sodas are out as indicated by status indicators 404, 406, and the proximate wireless-enabled programmable device 46 is playing music as shown by a status indicator 408. Residents use the map view 70 to gather real time information about the status of the residential property R and reports on any failures, for example. To view the thermostat data 50 captured by the thermostat 12 in each room or part of the residential property R, the map view users can select a room from the map and appropriately click or tap on the rooms and then select the thermostat data 50 or other processing operations requested.

The system 10 presented herein provides for the management of residential property R. In one embodiment, an onsite or web-hosted, cloud-based property monitoring and troubleshooting tool is furnished that provides the graphical presentation 350 of the residential property R with historic and real time room status. By way of example and not by way of limitation, the user may select to annotate the map view with rooms and amenities online/offline and rooms and amenity status.

Figure 11:
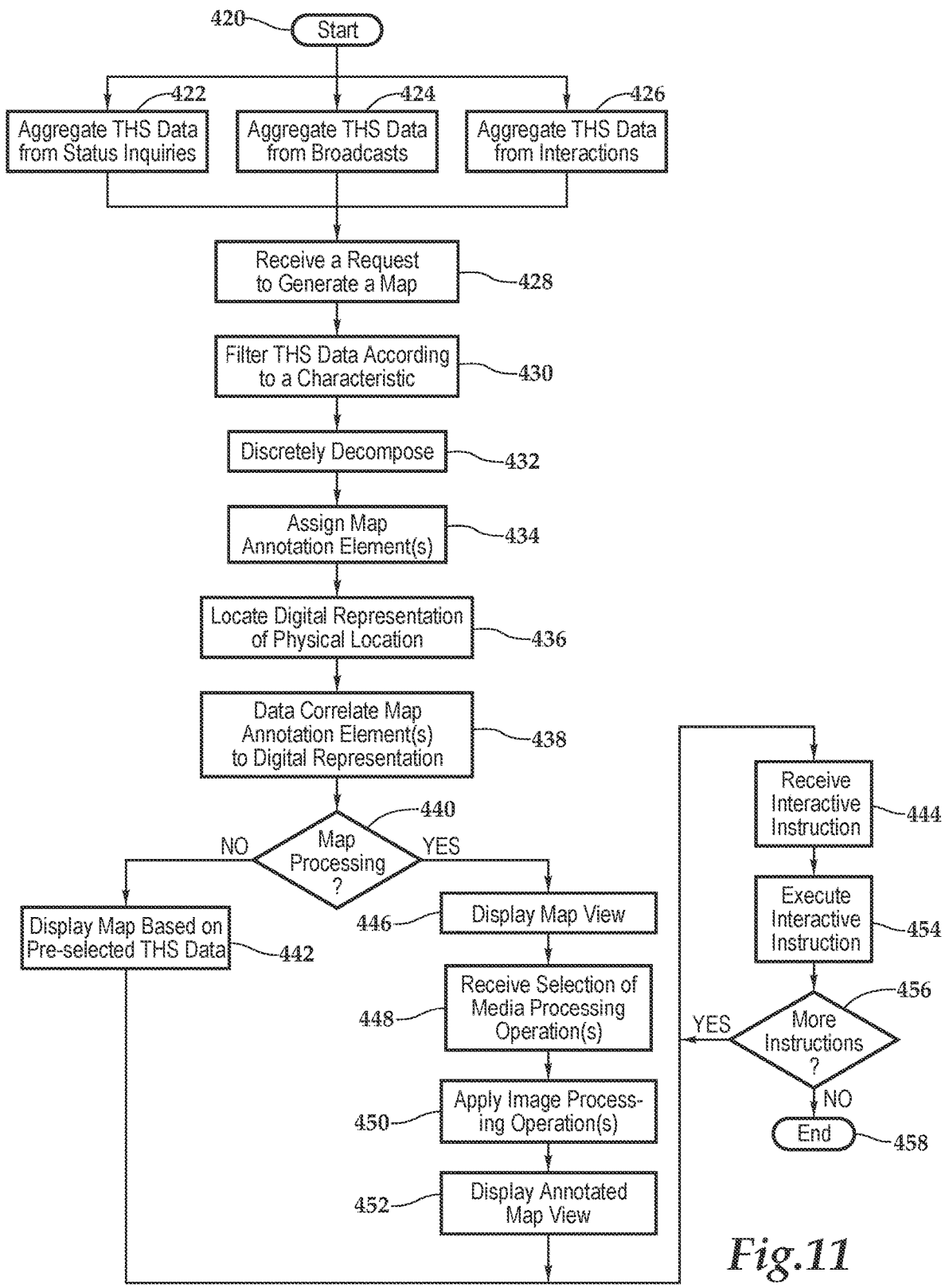
FIG. 11 is a flow chart depicting one embodiment of a method for providing a thermostat with interactive features according to the teachings presented herein.

Referring now to FIG. 11, one embodiment of a method for utilizing property management tools for the operation, control, and oversight of residential properties, for example, is depicted. The methodology starts at block 420 and progresses through blocks 422, 424, and 426 where, respectively thermostat data 50 is aggregated from status inquiries, broadcasts, and interactions with various amenities for example. At block 428, the thermostat receives a request to generate the map view of the residential property R. At block 430, the aggregated thermostat data is filtered according to a characteristic or characteristics. At blocks 432 and 434, the thermostat data 50 is discretely decomposed and assigned annotation elements. At block 436, the digital representation of the physical location, e.g., the residential property R, is located and at block 438, the data correlation of the map annotation elements to the digital representation occurs.

At decision block 440, if the map processing including any applied annotations are based on a pre-selected or pre-stored or pre-defined criteria, then the methodology advances to block 442 where the appropriate map view is rendered prior to block 444, where the methodology continues. On the other hand, at the decision block 440, if user input will be sought on the map view and annotations, then the methodology displays the map view at block 446. Then at block 448, the server receives selection of media processing operations from the user and then applies the image processing operations at block 450. The media processing operations may include, for example, selecting the media to be displayed and various luminance and color properties and such to provide further visibility into the map view. At block 452, the map view with annotations is rendered prior to the methodology continuing at block 444. At block 444, the thermostat receives an interactive instruction based on the map view and executes the instruction at block 454. At decision block 456, if there are more interactive instructions then the methodology returns to block 444, otherwise the methodology concludes at block 458.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for temperature control, the system comprising:
    a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and
    the non-transitory memory accessible to the processor, the non-transitory memory including first processor-executable instructions that, when executed by the processor, cause the system to:
        receive interactive data at the thermostat via the thermostat, the interactive data being, relative to the thermostat, information about display-based interactions with the thermostat, receive environmental data via the wireless transceiver, the environmental data being, relative to the thermostat, information about an amenity, the amenity being one of a plurality of amenities at a residential property, the thermostat being co-located at the residential property, receive smart device data via the wireless transceiver, the smart device data being information from a proximate wireless-enabled programmable device interacting with the thermostat, store thermostat data at the thermostat, the thermostat data including self-diagnostic data, the self-diagnostic data being information relative to faults in physical data, physical quality assurance data, program data, program quality assurance data, the interactive data, the environmental data, and the smart device data, maintain the thermostat data at the thermostat, render a map view of the residential property at the thermostat, the map view of the residential property based on obtained map data, the map view including an interactive graphical representation of the residential property, the plurality of amenities, and the proximate wireless-enabled programmable device, annotate the interactive graphical representation of the residential property at the thermostat with at least a portion of the thermostat data, and send the annotated interactive graphical representation of the residential property to the proximate wireless-enabled programmable device.

2. The system as recited in claim 1, wherein the residential property is selected from the group consisting of single-family homes, duplexes, townhomes, and apartments.

3. The system as recited in claim 1, wherein the processor-executable instructions further comprise processor-executable instructions that, when executed, cause the processor to render a 3-D perspective view of the residential property.

4. The system as recited in claim 1, wherein the processor-executable instructions further comprise processor-executable instructions that, when executed, cause the processor to render a multi-floor view of the residential property.

5. The system as recited in claim 1, wherein the processor-executable instructions further comprise processor-executable instructions that, when executed, cause the processor to render a 2-D top plan view of at least a portion of the residential property.

6. The system as recited in claim 1, wherein the processor-executable instructions further comprise processor-executable instructions that, when executed, cause the processor to render a map view of a room of the residential property.

7. The system as recited in claim 1, wherein the processor-executable instructions further comprise processor-executable instructions that, when executed, cause the processor to store program data, the program data being, relative to the thermostat, information about system software and application software.

8. The system as recited in claim 1, wherein the processor-executable instructions further comprise processor-executable instructions that, when executed, cause the processor to store program quality assurance data, the program quality assurance data being, relative to the thermostat, software state data of current operations of system software and application software.

9. The system as recited in claim 1, wherein the thermostat data further comprises identification data, the identification data including a location of the thermostat and information derived from physical data and program data.

10. The system as recited in claim 1, wherein the environmental data is selected from the group consisting of amenity interaction, lighting status, thermostat status, window shades status, and door status.

11. The system as recited in claim 1, wherein the smart device data is data received from a device selected from the group consisting of personal computers, laptops, smart phones, tablets, smart speakers, and smart watches.

12. The system as recited in claim 1, wherein the thermostat further comprises a display, the display being communicatively interconnected to the busing architecture.

13. A system for temperature control, the system comprising:
a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and the non-transitory memory accessible to the processor, the non-transitory memory including first processor-executable instructions that, when executed by the processor, cause the system to:

store physical data, the physical data being, relative to the thermostat, specifications of hardware and cable connection arrangements at time of installation, receive interactive data at the thermostat via the thermostat, the interactive data being, relative to the thermostat, information about display-based interactions with the thermostat, receive environmental data via the wireless transceiver, the environmental data being, relative to the thermostat, information about an amenity, the amenity being one of a plurality of amenities at a residential property, the thermostat being co-located at the residential property, receive smart device data via the wireless transceiver, the smart device data being information from a proximate wireless-enabled programmable device interacting with the thermostat, store thermostat data at the thermostat, the thermostat data including the interactive data, the environmental data, and the smart device data, maintain the thermostat data at the thermostat, render a map view of the residential property at the thermostat, the map view of the residential property based on obtained map data, the map view including an interactive graphical representation of the residential property, the plurality of amenities, and the proximate wireless-enabled programmable device, annotate the interactive graphical representation of the residential property at the thermostat with at least a portion of the thermostat data, and send the annotated interactive graphical representation of the residential property to the proximate wireless-enabled programmable device.

14. A system for temperature control, the system comprising:
a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and the non-transitory memory accessible to the processor, the non-transitory memory including first processor-executable instructions that, when executed by the processor, cause the system to:
- store physical quality assurance data, the physical quality assurance data being, relative to the thermostat, physical state data of a current condition of hardware and cable connections,
- receive interactive data at the thermostat via the thermostat, the interactive data being, relative to the thermostat, information about display-based interactions with the thermostat,
- receive environmental data via the wireless transceiver, the environmental data being, relative to the thermostat, information about an amenity, the amenity being one of a plurality of amenities at a residential property, the thermostat being co-located at the residential property,
- receive smart device data via the wireless transceiver, the smart device data being information from a proximate wireless-enabled programmable device interacting with the thermostat,
- store thermostat data at the thermostat, the thermostat data including the interactive data, the environmental data, and the smart device data,
- maintain the thermostat data at the thermostat,
- render a map view of the residential property at the thermostat, the map view of the residential property based on obtained map data, the map view including an interactive graphical representation of the residential property, the plurality of amenities, and the proximate wireless-enabled programmable device,
- annotate the interactive graphical representation of the residential property at the thermostat with at least a portion of the thermostat data, and
- send the annotated interactive graphical representation of the residential property to the proximate wireless-enabled programmable device.

* * * * *